US009635017B2

(12) United States Patent
Lee

(10) Patent No.: US 9,635,017 B2
(45) Date of Patent: Apr. 25, 2017

(54) COMPUTER NETWORK SECURITY MANAGEMENT SYSTEM AND METHOD

(71) Applicant: Chung Jong Lee, Seoul (KR)

(72) Inventor: Chung Jong Lee, Seoul (KR)

(*) Notice: Subject to any disclaimer, the term of this patent is extended or adjusted under 35 U.S.C. 154(b) by 0 days.

(21) Appl. No.: 14/973,060

(22) Filed: Dec. 17, 2015

(65) Prior Publication Data

US 2016/0105417 A1 Apr. 14, 2016

Related U.S. Application Data

(62) Division of application No. 14/012,494, filed on Aug. 28, 2013, now Pat. No. 9,432,357.

(51) Int. Cl.
*G06F 3/00* (2006.01)
*H04L 29/06* (2006.01)
*H04L 29/08* (2006.01)

(52) U.S. Cl.
CPC ............ *H04L 63/083* (2013.01); *H04L 63/06* (2013.01); *H04L 63/08* (2013.01); *H04L 63/10* (2013.01); *H04L 63/20* (2013.01); *H04L 67/306* (2013.01)

(58) Field of Classification Search
CPC ................................. H04L 63/08; H04L 63/20
See application file for complete search history.

(56) References Cited

U.S. PATENT DOCUMENTS

| 7,779,457 | B2 * | 8/2010 | Taylor | G06F 21/32 713/186 |
| 8,024,785 | B2 * | 9/2011 | Andress | H04L 63/08 726/11 |
| 2005/0132192 | A1 * | 6/2005 | Jeffries | H04L 9/3228 713/169 |
| 2006/0101508 | A1 * | 5/2006 | Taylor | G06F 21/32 726/7 |
| 2007/0174469 | A1 * | 7/2007 | Andress | H04L 63/0884 709/227 |
| 2009/0043723 | A1 * | 2/2009 | Hino | G06F 17/3089 706/46 |
| 2009/0113539 | A1 * | 4/2009 | Shu | H04L 12/2821 726/12 |
| 2010/0142430 | A1 * | 6/2010 | Cho | H04L 12/185 370/312 |
| 2013/0198274 | A1 * | 8/2013 | Papakipos | H04L 51/32 709/204 |
| 2013/0198383 | A1 * | 8/2013 | Tseng | H04L 63/102 709/225 |
| 2014/0177821 | A1 * | 6/2014 | Ristock | G06Q 10/0631 379/266.08 |

* cited by examiner

*Primary Examiner* — Joseph P Hirl
*Assistant Examiner* — Sayed Beheshti Shirazi
(74) *Attorney, Agent, or Firm* — Novick, Kim & Lee, PLLC; Jae Youn Kim

(57) ABSTRACT

A computer network security management system is provided, in which a corporate computer network can be substantially separated from an external network because the external exposure of the corporate computer network is minimized, and a possibility that a hacker may get into a relay server or a central server can be fundamentally cut off. The computer network security management system is expected to further enhance the security level of a corporate computer network.

8 Claims, 6 Drawing Sheets

COMPUTER NETWORK SECURITY MANAGEMENT SYSTEM AND METHOD

BACKGROUND OF THE INVENTION

1. Technical Field

The present invention relates to a computer network security management system and, more particularly, to a computer network security management system and method for managing the security of a corporate computer network by means of a compartment server for cutting off the corporate computer network and an external network.

2. Description of the Related Art

In most companies and public institutes, corporate computer networks are constructed to perform data transmission between terminals and sanction.

With the development of communication technology, telecommuting or outside service in which persons perform company affairs outside is increased. A person who performs outside service accesses a corporate computer network outside a company in real time or intermittently and downloads/uploads specific data or performs sanction on specific data.

The security of a corporate computer network becomes vulnerable by this outside service. That is, a corporate computer network is equipped with security means, external illegal access, such as company spies or hackers, are inevitably increased in the state in which the corporate computer network has been opened.

In particular, special security management is necessary for a military unit which handles national security or a nuclear generator in which a trifle misoperation is not allowed. If a hacker gets into a national defense computer network and launches a missile or continues to coax forth important national information using a malicious program, this will lead to fatal results for national defense. Meanwhile, in financial institutes, the deposits of customers are illegally drawn. This also results from coarse security management for a corporate computer network.

As a method of solving the problems, a relay server is placed between a central server and an external network, and whether or not to permit access to the relay server is determined based on an illegal access list or the authentication of access information.

In a conventional relay server, however, access by a client remains intact until illegal access is detected, and there is a possibility that a hacker may get into a central server if illegal access is not detected. Furthermore, it is difficult to track this illegal access, and a malicious program remains in a relay server, even in a central server once the illegal access is made although the illegal access is detected. As a result, the central server in addition to the relay server may have to be replaced or formatted.

SUMMARY OF THE INVENTION

An important aspect of the present invention is that the present inventors recognized certain drawbacks of the related art, as mentioned above. As a result, the present inventors provided a solution to such drawbacks, as follows.

The present invention has been made keeping in mind the above problems occurring in the prior art, and an object of the present invention is to provide a computer network security management system capable of fundamentally preventing a hacker from getting into the relay server or central server of a corporate computer network by minimizing the external exposure of the corporate computer network.

A computer network security management system for achieving the above object includes a central server and a compartment server.

The central server includes an authentication information database for storing access authentication information. The central server compares access information with the access authentication information stored in the authentication information database when the access information is received, sends access approval if the received access information is identical with the stored access authentication information, and sends request data complying with a data request related to the access-approved access information when the data request is received.

The compartment server receives the access information, a client identifier, and the data request from a client. The compartment server immediately cuts off access by the client when the access information, etc. is received. The compartment server sends the access information to the central server. The compartment server sends the data request to the central server when access approval is received from the central server and receives the request data complying with the data request from the central server. The compartment server sends the received request data to the client using the client identifier.

The compartment server may request the client to access the compartment server again using the client identifier. In this case, when the client accesses the compartment server again, the compartment server sends the request data to the client.

The access information and the access authentication information include at least one of a login ID, a password, an IP address, a telephone number, and an authentication key. Here, the access authentication information may further include an access permission time.

The client identifier may include at least one of an IP address, a telephone number, and an e-mail address.

A compartment server having a security function in accordance with the present invention includes an authentication information database and a controller.

The authentication information database stores access authentication information.

The controller immediately cuts off access by a client when receiving access information, a client identifier, and a data request from the client. The controller compares the access information with the access authentication information stored in the authentication information database and sends the data request to a central server if the received access information is identical with the stored access authentication information. The controller sends request data to the client using the client identifier when receiving the request data, that is, a response to the data request, from the central server.

The controller may request the client to access the controller again using the client identifier. The controller sends the request data to the client when the client accesses the controller again.

The access information and the access authentication information include at least one of a login ID, a password, an IP address, a telephone number, and an authentication key. Here, the access authentication information may further include an access permission time.

The client identifier may include at least one of an IP address, a telephone number, and an e-mail address.

A computer network security management method in accordance with a first embodiment of the present invention includes receiving, by a compartment server, access information, a client identifier, and a data request from a client;

cutting off, by the compartment server, access by the client; determining, by the compartment server, whether or not the access information is identical with access authentication information stored in an authentication information database by comparing the access information with the access authentication information; sending, by the compartment server, the data request to a central server if the access information is identical with the access authentication information; receiving, by the compartment server, request data complying with the data request from the central server; and sending, by the compartment server, the request data to the client using the client identifier.

Sending, by the compartment server, the request data to the client using the client identifier may further include requesting, by the compartment server, the client to access the compartment server. In this case, when the client accesses the compartment server again, the compartment server sends the request data to the client.

The access information and the access authentication information include at least one of a login ID, a password, an IP address, a telephone number, and an authentication key. Here, the access authentication information may further include an access permission time.

The client identifier may include at least one of an IP address, a telephone number, and an e-mail address.

A computer network security management method in accordance with a second embodiment of the present invention includes receiving, by a compartment server, access information, a client identifier, and a data request from a client; cutting off, by the compartment server, access by the client; sending, by the compartment server, the access information to a central server; determining, by the central server, whether or not the access information is identical with access authentication information stored in an authentication information database by comparing the access information with the access authentication information; sending, by the central server, access approval to the compartment server if the access information is identical with the access authentication information; sending, by the compartment server, the data request to the central server when the access approval is received; sending, by the central server, request data complying with the data request to the compartment server; and sending, by the compartment server, the request data to the client using the client identifier.

Sending, by the compartment server, the request data to the client using the client identifier may further include requesting, by the compartment server, the client to access the compartment server again. In this case, when the client accesses the compartment server again, the compartment server sends the request data to the client.

The access information and the access authentication information include at least one of a login ID, a password, an IP address, a telephone number, and an authentication key. Here, the access authentication information may further include an access permission time.

The client identifier may include at least one of an IP address, a telephone number, and an e-mail address.

Additional characteristics and advantages of the present invention will be described in the following description and will be partially made evident by the description or understood by the execution of the present invention. The object and other advantages of the present invention will be implemented by, in particular, structures written in the claims in addition to the following description and the accompanying drawings.

Figure 1:
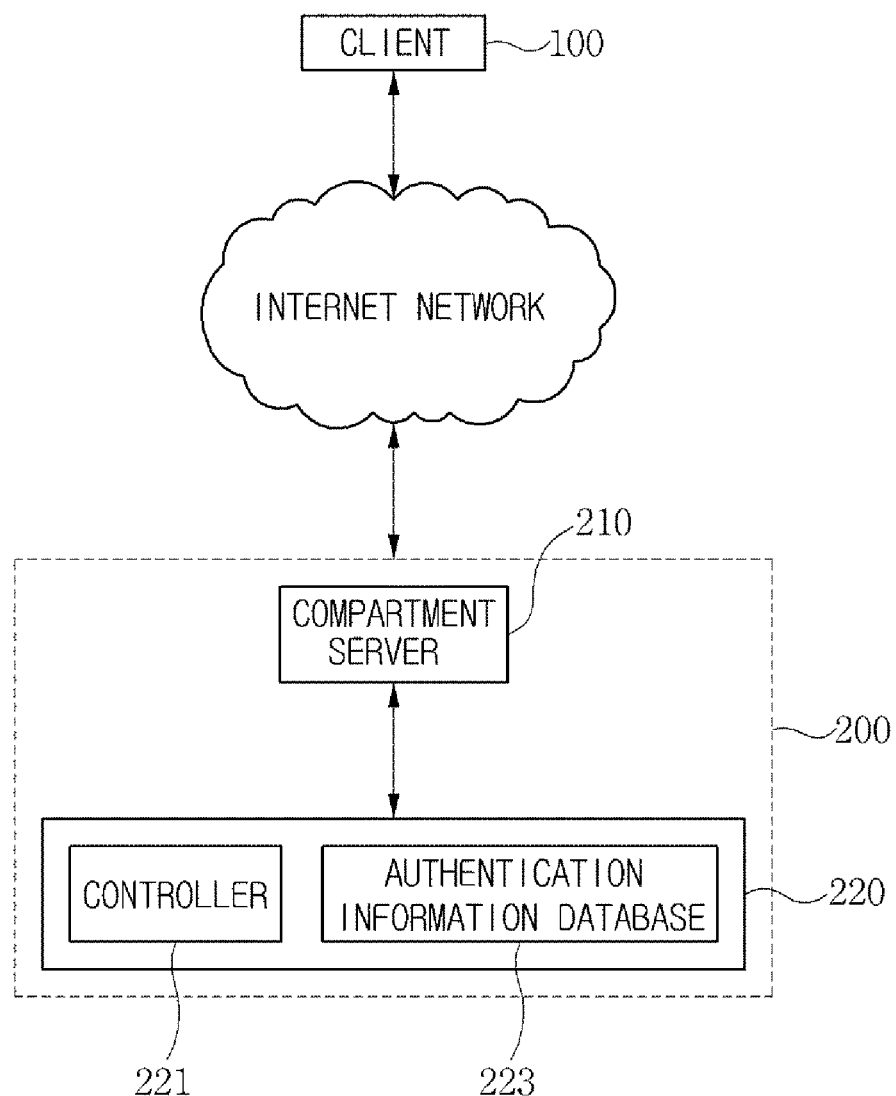
FIG. 1 is a block diagram of a computer network security management system in accordance with a first embodiment of the present invention.

<Description of reference numerals of principal elements in the drawings>

100: client
200, 300: corporate computer network
210, 310: compartment server
220, 320: central server

DETAILED DESCRIPTION

Hereinafter, the present invention is described in detail with reference to the accompanying drawings.

FIG. 1 is a block diagram of a computer network security management system in accordance with a first embodiment of the present invention.

As shown in FIG. 1, the computer network security management system in accordance with the present invention includes a compartment server 210 and a central server 220. The computer network security management system of FIG. 1 is configured so that the central server 220 authenticates a client 100.

A corporate computer network 200 is connected to the external client 100 over an Internet network. Although not shown in FIG. 1, the corporate computer network 200 can further include an account server (not shown) between the client 100 and the compartment server 210.

The compartment server 210 is a kind of relay server for relaying data between the client 100 and the central server 220. The compartment server 210 transfers a specific request to the central server 220 when the specific request is received from the client 100, receives a response to the specific request from the central server 220, and transfers the response to the client 100.

More particularly, the compartment server 210 receives access information, a client identifier, and a data request from the client 100. The access information includes pieces of information that are used by the client 100 for identification in order for the client 100 to access the compartment server 210 or the central server 220. For example, the pieces of information can include a login ID, a password, an IP address, a telephone number, and an authentication key. The client 100 sends at least one of the pieces of access information to the compartment server 210. Meanwhile, the client identifier includes pieces of information used by the compartment server 210 in order to access the client 100. The pieces of information used by the compartment server 210 include an IP address of a client, a telephone number of a client user, and an e-mail address of a client user. The compartment server 210 sends request data to the client 100 or calls the client 100 using at least one of the client identifiers.

When the access information is received from the client 100, the compartment server 210 immediately cuts off access to the client 100. This is for the purpose of fundamentally cutting off an illegal behavior (e.g., hacking) from the client 100.

The compartment server 210 sends the access information, received from the client 100, to the central server 220 and receives access approval from the central server 220. Furthermore, the compartment server 210 sends a data request, received from the client 100, to the central server 220 and receives request data complying with the data request from the central server 220.

The compartment server 210 sends the request data, received from the central server 220, to the client 100 using the client identifier received from the client 100. Here, the compartment server 210 does not directly send the request data, received from the central server 220, to the client 100, but may request the client 100 to access the compartment server 210 using the client identifier. When the client 100 accesses the compartment server 210 again, the compartment server 210 sends the request data to the client 100.

The central server 220 includes a controller 221 and an authentication information database 223.

The authentication information database 223 stores a login ID, a password, an IP address, a telephone number, and an authentication key that correspond to the access information transmitted by the client 100. The authentication information database 223 can further store an access permission time for the client 100 in addition to the access information. If outside service is many and the time when a person who performs the outside service can access the corporate computer network 200 is predetermined, the time can be used as authentication information for cutting off illegal access by the client 100. That is, if an access permission time of the client 100 is not identical with that included in the access information received from the client 100, an access attempt by the client 100 is treated as illegal access.

The controller 221 receives the access information from the compartment server 210, determines whether or not the access information is identical with access authentication information stored in the authentication information database 223, and sends access approval to the compartment server 210 if, as a result of the determination, it is determined that the received access information is identical with the stored access authentication information. Thereafter, the controller 221 receives the data request of the client 100 from the compartment server 210 and sends the request data, corresponding to the data request, to the compartment server 210.

Figure 2:
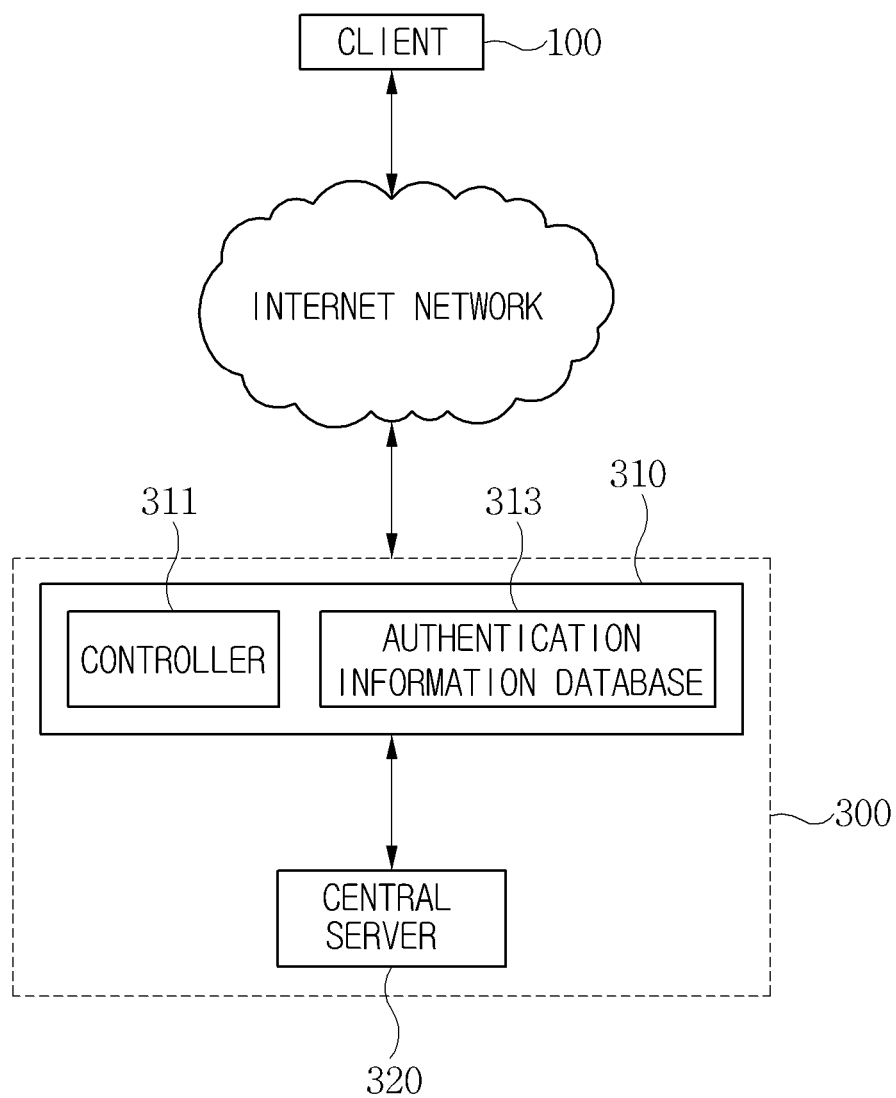
FIG. 2 is a block diagram of a computer network security management system in accordance with a second embodiment of the present invention.

FIG. 2 is a block diagram of a computer network security management system in accordance with a second embodiment of the present invention.

As shown in FIG. 2, the computer network security management system in accordance with the second embodiment of the present invention includes a compartment server 310 and a central server 320. The computer network security management system of FIG. 2 is configured so that the compartment server 310 authenticates a client 100 as shown in FIG. 2. Elements and functions of the computer network security management system of FIG. 2 which are different from those of FIG. 1 are chiefly described below.

Like in FIG. 1, a corporate computer network 300 is connected to the external client 100 over an Internet network. An account server (not shown) can be further included between the client 100 and the compartment server 310.

The compartment server 310 includes a controller 311 and an authentication information database 313.

The authentication information database 313 stores a login ID, a password, an IP address, a telephone number, and an authentication key corresponding to access information transmitted by the client 100. The authentication information database 313 can further store an access permission time for the client 100 in addition to the access information.

The controller 311 receives the access information, a client identifier, and a data request from the client 100. The access information can include, for example, a login ID, a password, an IP address, a telephone number, and an authentication key. The client identifier can include an IP address of a client, a telephone number of a client user, and an e-mail address of the client user.

The controller 311 immediately cuts off access by the client 100 when the access information is received from the client 100 and determines whether or not the received access information is identical with access authentication information stored in the authentication information database 313. If, as a result of the determination, it is determined that the received access information is identical with the stored access authentication information, the controller 311 sends the data request, received from the client 100, to the central server 320. Thereafter, when request data complying with the data request is received from the central server 320, the controller 311 sends the request data to the client 100.

The controller 311 does not directly send the request data, received from the central server 220, to the client 100, but may request the client 100 to access the compartment server 310 again using the client identifier. When the client 100 accesses the compartment server 310 again, the controller 311 sends the request data to the client 100.

When the data request is received from the compartment server 310, the central server 320 sends the request data complying with the data request to the compartment server 310. The central server 320 can include an additional database for storing the request data.

Figure 3A:
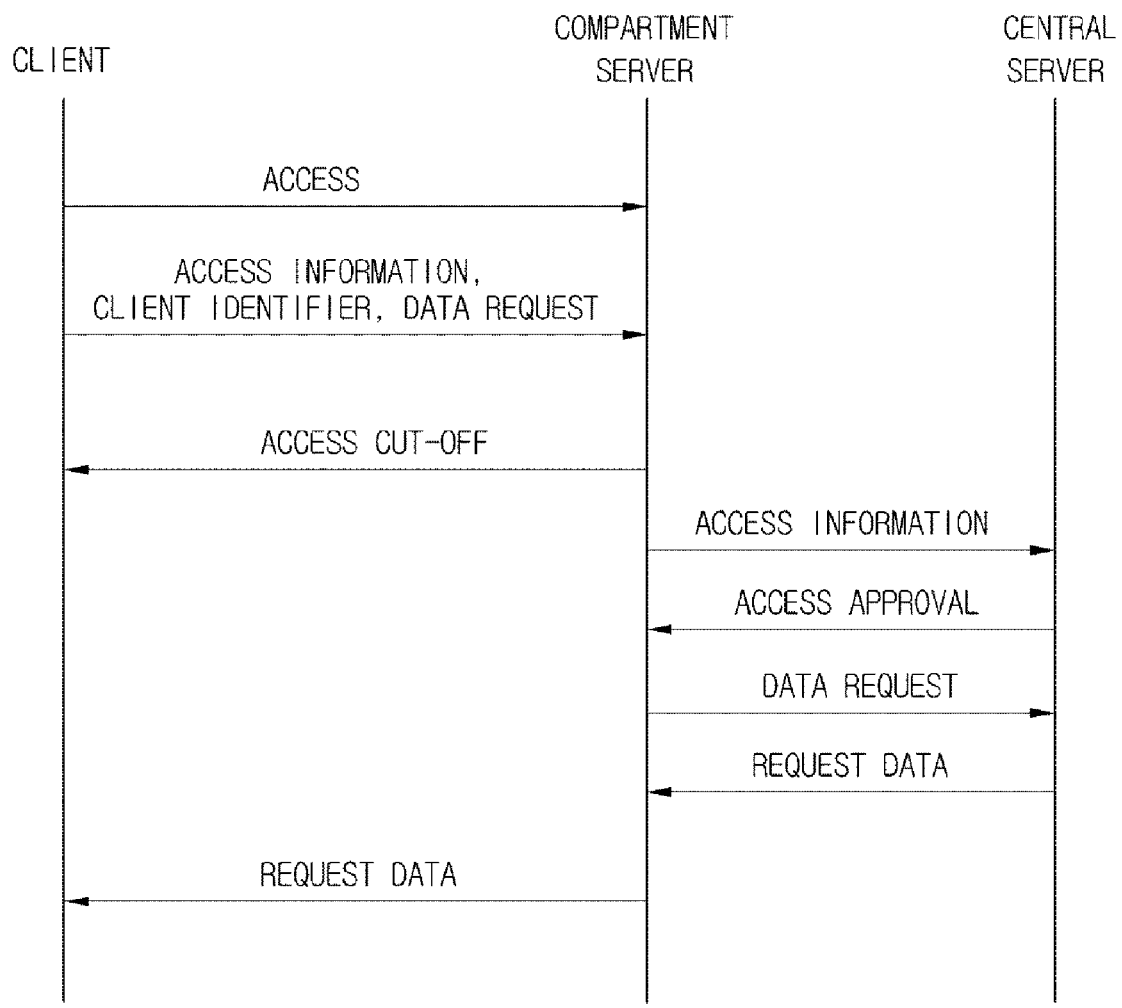
FIGS. 3A and 3B are data flows illustrating the flow of data between a client, a compartment server, and a central server in the computer network security management system in accordance with a first embodiment of the present invention.
Figure 3B:
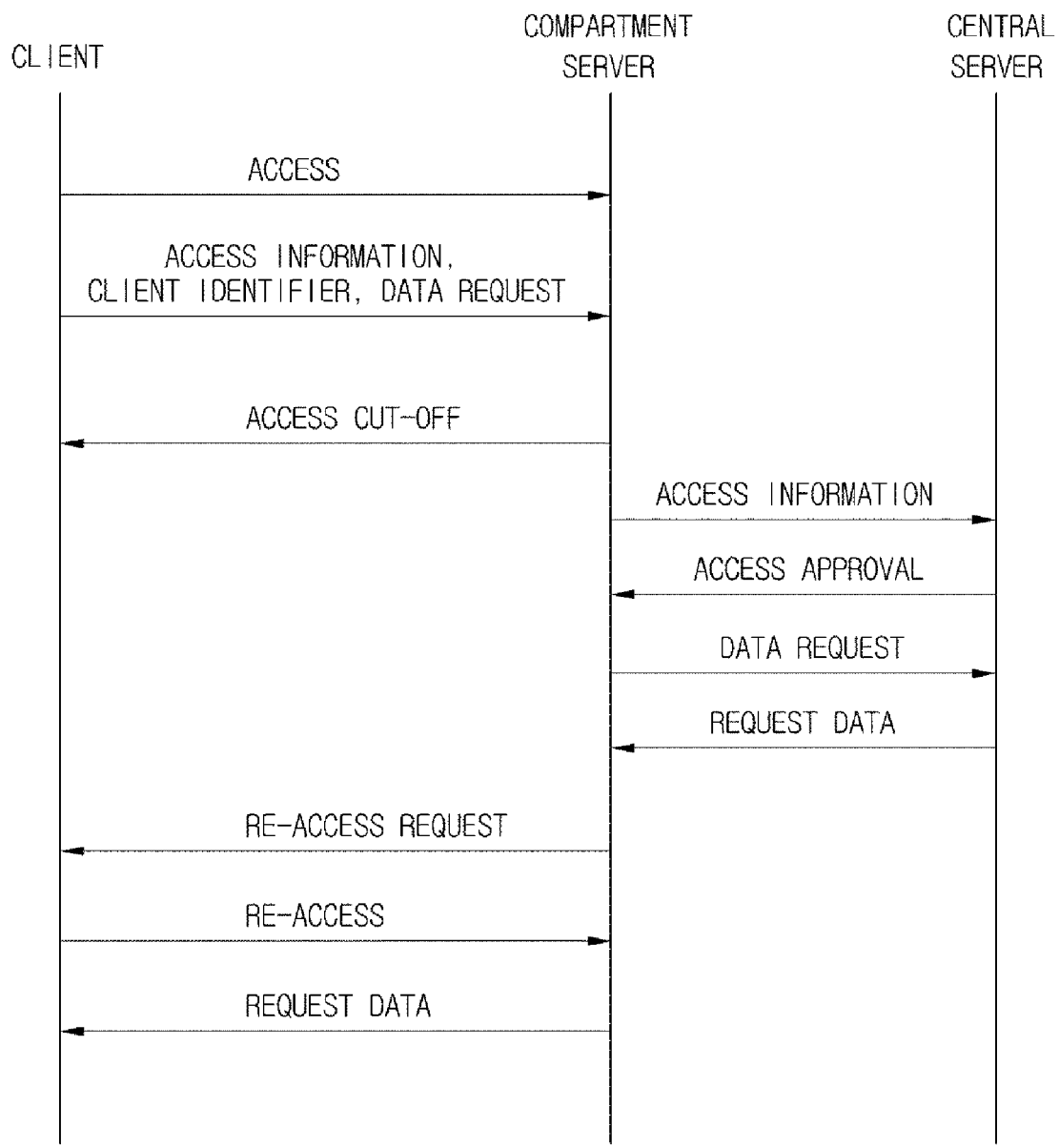

FIGS. 3A and 3B are data flows illustrating the flow of data between the client, the compartment server, and the central server in the computer network security management system in accordance with a first embodiment of the present invention.

As shown in FIG. 3a, first, the client accesses the compartment server. Here, the client sends access information, such as a login ID, a password, an IP address, a telephone number, and an authentication key, and a client identifier, such as a client IP address, a user telephone number, and a user e-mail address, to the compartment server along with a data request for desired data.

When the compartment server receives the access information, the client identifier, and the data request, the compartment server cuts off access by the client.

Thereafter, the compartment server sends the access information, received from the client, to the central server. Here, the central server determines whether or not the received access information is identical with access authentication information stored in its authentication information database and sends access approval to the compartment server if, as a result of the determination, it is determined that the received access information is identical with the stored access authentication information.

When the access approval is received from the central server, the compartment server sends the data request, received from the client, to the central server. Here, the central server extracts request data complying with the data request and sends the request data to the compartment server.

When the request data is received from the central server, the compartment server sends the request data to the client using the client identifier received from the client. For example, if a user e-mail is used as the client identifier, the compartment server sends the request data to the user e-mail.

Meanwhile, as shown in FIG. 3b, the compartment server does not directly send the request data to the client, but may request the client to access the compartment server again. In this case, the re-access request is made using the client identifier. For example, if a user e-mail is used as the client identifier, the compartment server can send a re-access request message as the user e-mail. At this time, an access permission time can also be transmitted. In this case, the access permission time transmitted as the user e-mail can function as additional authentication information.

When the client accesses the compartment server at the access permission time, the compartment server sends the request data to the client. In this case, the compartment server may receive access information as a response to the access of the client and authenticate the client once more.

Figure 4A:
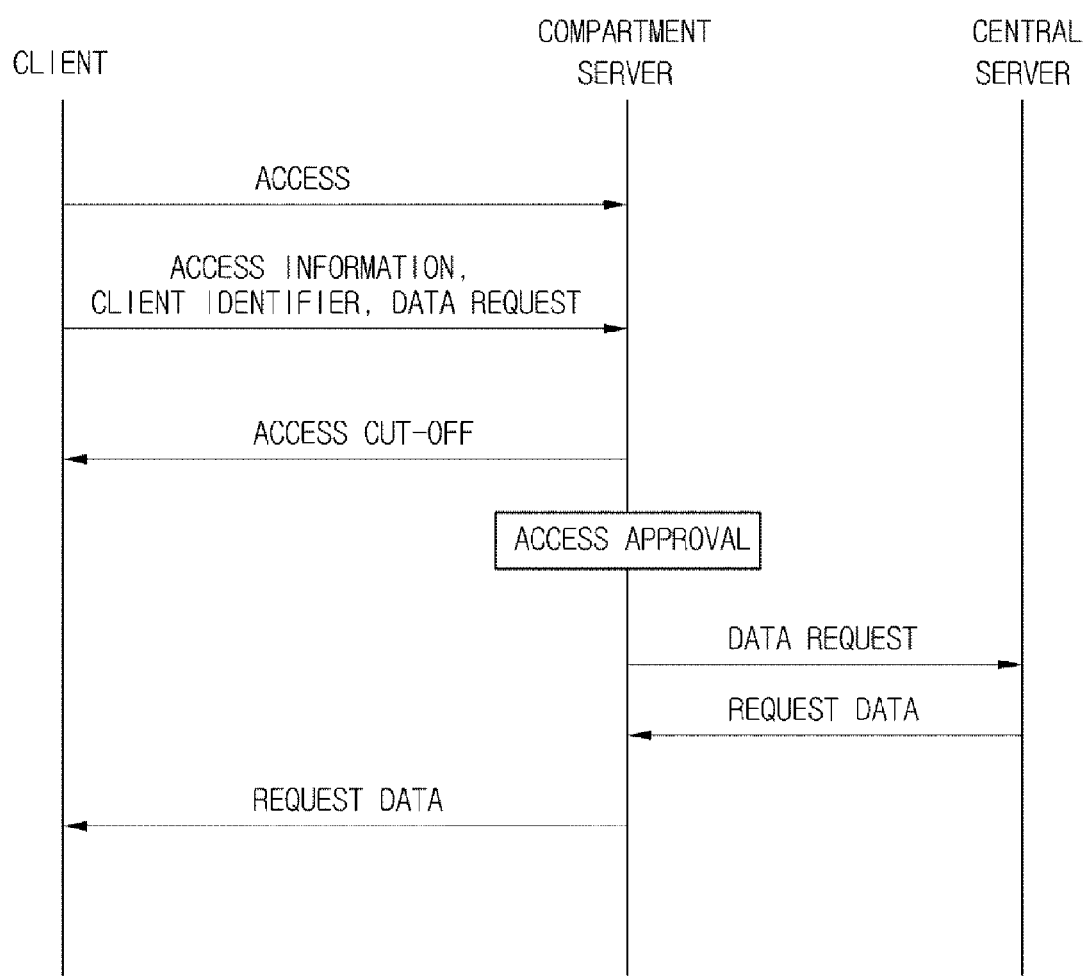
FIGS. 4A and 4B are data flows illustrating the flow of data between the client, the compartment server, and the central server in the computer network security management system in accordance with a second embodiment of the present invention.
Figure 4B:
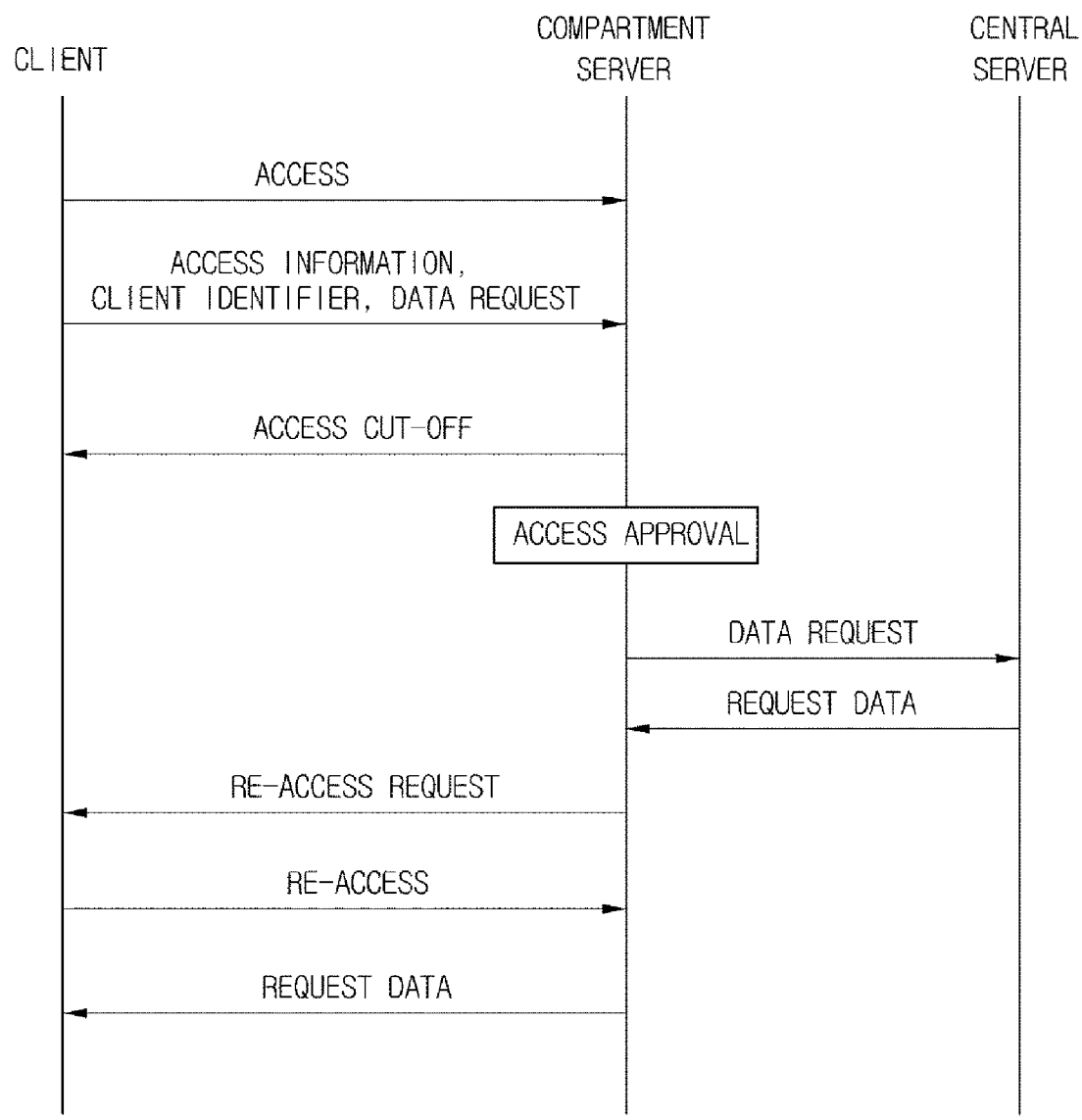

FIGS. 4A and 4B are data flows illustrating the flow of data between the client, the compartment server, and the central server in the computer network security management system in accordance with a second embodiment of the present invention.

As shown in FIG. 4a, first, the client accesses the compartment server. Here, the client sends access information, such as a login ID, a password, an IP address, a telephone number, and an authentication key, and a client identifier, such as a client IP address, a user telephone number, and a user e-mail address, to the compartment server along with a data request.

When the compartment server receives the access information, the client identifier, and the data request, the compartment server immediately cuts off access by the client.

Thereafter, the compartment server determines whether or not the received access information is identical with access authentication information stored in its authentication information database and sends the data request, received from the client, to the central server if, as a result of the determination, it is determined that the received access information is identical with the stored access authentication information.

When the data request is received from the compartment server, the central server sends request data complying with the data request to the compartment server.

When the request data is received from the central server, the compartment server sends the request data to the client using the client identifier received from the client. For example, the compartment server sends the request data to the e-mail address of the client user.

Meanwhile, as shown in FIG. 4b, the compartment server does not directly send the request data to the client, but may request the client to access the compartment server again. In this case, in the re-access request, an SMS message can be transmitted to, for example, the user telephone number. The re-access request message can further include an access permission time. In this case, the access permission time can function as authentication information.

When the client accesses the compartment server at the access permission time, the compartment server sends the request data to the client. In this case, the compartment server may receive access information as a response to the access of the client and authenticate the client once more.

In the first and second embodiments illustrated above, it has been assumed that data requested by the client is stored in the central server. However, data requested by the client may be stored in the compartment server in a 'mirror data (i.e., it means that data stored in the central server has been copied to the compartment server without change)' form. In this case, the transmission of a data request and request data between the compartment server and the central server is not necessary, but data between the compartment server and the central server is updated regularly or in real time.

In the computer network security management systems described above in accordance with the present invention, a corporate computer network can be substantially separated from an external network because the external exposure of the corporate computer network is minimized, and a possibility that a hacker may get into a relay server or a central server can be fundamentally cut off. The computer network security management system of the present invention is expected to further enhance the security level of a corporate computer network.

Although some embodiments of the present invention have been described, the embodiments are provided to only illustrate the present invention, but are not intended to limit the present invention. Furthermore, those skilled in the art can modify or change the present invention in various ways. Accordingly, the scope of the present invention should be determined based on the following claims, and such modification or changes made by those skilled in the art may be construed as being included in the scope of the present invention.

What is claimed is:

1. A computer network security management system for security, comprising:

a central server including an authentication information database for storing access authentication information and one or more hardware processor configured to compare access information with the access authentication information stored in the authentication information database when the access information is received, send access approval if the received access information is identical with the stored access authentication information, and send requested data complying with a data request related to the access-approved access information when the data request is received; and a compartment server including one or more hardware processor configured to cut off access by a client when the access information, a client identifier, and the data request are received from the client, send the access information to the central server, send the data request to the central server when the access approval is received from the central server, receive the requested data from the central server as a response to the data request, and send the received requested data to the client using the client identifier, wherein the compartment server sends a re-access request to the client using the client identifier and sends the requested data to the client when the client accesses the compartment server again.

2. The computer network security management system of claim 1, wherein the access information and the access authentication information comprise at least one of a login ID, a password, an IP address, a telephone number, and an authentication key.

3. The computer network security management system of claim 2, wherein the access authentication information further comprises an access permission time.

4. The computer network security management system of claim 1, wherein the client identifier comprises at least one of an IP address, a telephone number, and an e-mail address.

5. A computer network security management method, comprising:

receiving, by a compartment server, access information, a client identifier, and a data request from a client;

cutting off, by the compartment server, using one or more hardware processor, access by the client when receiving the access information, the client identifier and the data request from the client;

sending, by the compartment server, the access information to a central server;

determining, by the central server, using one or more hardware processor, whether or not the access information is identical with access authentication information stored in an authentication information database by comparing the access information with the access authentication information;

sending, by the central server, access approval to the compartment server if the access information is identical with the access authentication information;

sending, by the compartment server, the data request to the central server when the access approval is received;

sending, by the central server, requested data complying with the data request to the compartment server; and sending, by the compartment server, the requested data to the client using the client identifier, wherein sending, by the compartment server, the requested data to the client using the client identifier comprises:

sending, by the compartment server, a re-access request to the client using the client identifier; and accessing, by the client, the compartment server again.

6. The computer network security management method of claim 5, wherein the access authentication information comprises at least one of a login ID, a password, an IP address, a telephone number, and an authentication key.

7. The computer network security management method of claim 6, wherein the access authentication information further comprises an access permission time.

8. The computer network security management method of claim 5, wherein the client identifier comprises at least one of an IP address, a telephone number, and an e-mail address.

* * * * *